(No Model.)
I. F. ZIMMERMAN.
LUBRICATOR.
No. 536,824. Patented Apr. 2, 1895.
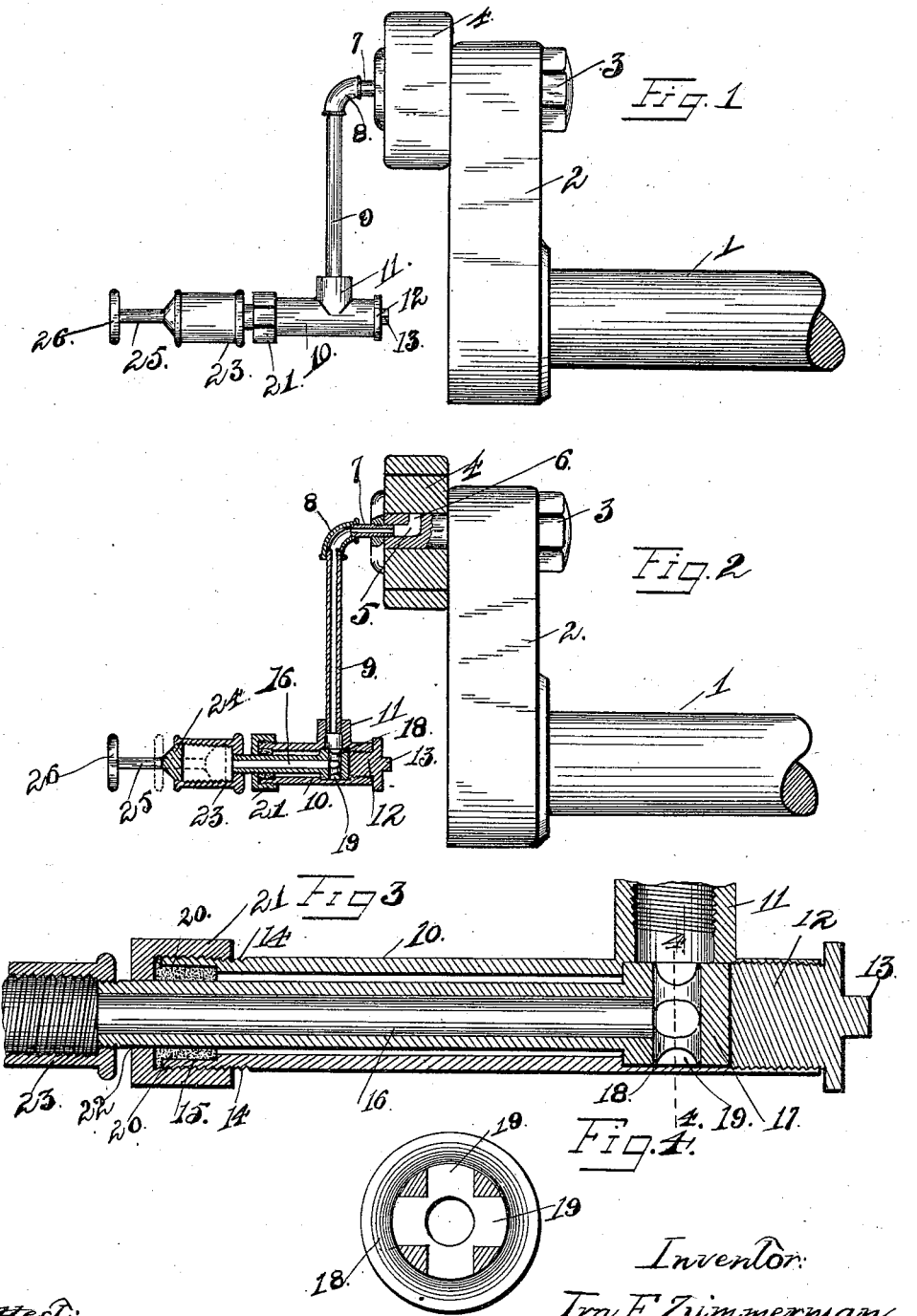
Inventor:
Ira F. Zimmerman,
by Higdon and Higdon and Longan,
Attys.
Attest:
A. A. Blankmun Jr.
M. P. Smith.

UNITED STATES PATENT OFFICE.

IRA FRANCIS ZIMMERMAN, OF SEDALIA, MISSOURI.

LUBRICATOR.

SPECIFICATION forming part of Letters Patent No. 536,824, dated April 2, 1895.

Application filed September 4, 1894. Serial No. 522,127. (No model.)

*To all whom it may concern:*

Be it known that I, IRA FRANCIS ZIMMERMAN, of the city of Sedalia, Pettis county, State of Missouri, have invented certain new and useful Improvements in Grease-Cup Attachments for Crank-Pins, of which the following is a full, clear, and exact description, reference being had to the accompanying drawings, forming a part hereof.

My invention relates to a grease cup attachment for crank-pins, the object of my invention being to construct a device of this character that shall possess superior advantages in point of simplicity, durability and general efficiency.

My invention consists in certain novel features of construction, combination and arrangement of parts, hereinafter specified and claimed.

Referring to the drawings: Figure 1 is an elevation of a portion of the crank-shaft with its usual attachments, and showing my improvement in position as required for practical use. Fig. 2 is a longitudinal sectional view of my complete device, the same being shown attached to the crank-pin. Fig. 3 is a longitudinal sectional view of the casing and the tube that operates independently within said casing. Fig. 4 is a vertical sectional view taken approximately on the indicated line 4—4 of Fig. 3, and showing the construction of the head of the tube.

Referring by numerals to the accompanying drawings, 1 indicates the ordinary crank-shaft to which is secured in the ordinary manner the crank 2. Upon the outer end of this crank 2, and held in position thereon by means of the crank-pin 3, is the usual connecting-rod 4. Centrally located in the end of the crank-pin 3, and extending a slight distance toward the rear of said crank-pin, is a passage 5. Said passage 5 communicates with a vertical passage 6 in the crank-pin, said vertical passage 6 communicating with the periphery of said pin, and said periphery being engaged by the bearing formed in the connecting-rod 4. A portion of the passage 5 is screw-threaded and adapted to receive the exteriorly screw-threaded end of a tube 7, said tube 7 extending but a slight distance beyond the outer surface of the head of the driving-arm. To the outer end of this tube 7 is secured an ordinary elbow 8, to the other end of said elbow there being secured one end of a tube 9, said tube 9 extending parallel with the crank 2 and terminating at a point slightly above a horizontal line drawn through the diametrical center of the crank-shaft 1.

A casing 10 is provided with an integral upwardly extending portion 11 interiorly screw-threaded, by means of which said casing 10 is secured to the lower end of the tube 9. This casing 10 is concentric to a line drawn through the diametrical center of the crank-shaft 1. The forward end of this casing 10 is interiorly screw-threaded and adapted to receive a plug 12, the exterior of which is screw-threaded. This plug is provided with an extension 13, upon which is adapted to be located a wrench, or other manipulating device. The interior diameter of this screw-threaded portion in the rear of the casing and that portion of the casing adjacent the upwardly extending portion 11, is slightly larger than the interior diameter of the main portion of the casing, the purpose of which will be presently shown. The exterior of the forward end of the casing is screw-threaded as indicated by 14, and the inner periphery of said forward end being raised as indicated by 15.

A tube 16 is adapted to be located in the casing 10, said tube 16 being provided with a head 17 that snugly fits within the enlarged interior diameter of the casing 10 immediately below the projection 11. This head is circular in cross-section, and is provided with the centrally located peripheral groove 18 and cross-passages 19, said cross-passages communicating with the groove 18, and with the centrally located longitudinal passage in the tube 16. When this tube 16 is in position within the casing 10, it projects a slight distance beyond the screw-threaded end 14 of said casing 10.

Suitable packing 20 is located in the recess 15 and an interiorly screw-threaded cap 21 provided with an aperture 22 in its face, is passed over the end of the tube 16 and screwed upon the forward end of the casing 10. This forms an ordinary stuffing-box.

That portion of the tube 16 that extends through the aperture 22 in the cap 21 is exteriorly screw-threaded and has positioned thereon a cup 23, the same being interiorly screw-threaded its entire length.

A plunger 24 is adapted to screw into the cup 23, and is provided with a stem 25 and hand-wheel 26. Thus it will be seen that the centers of the casing, tube 16, the cup and the plunger are all on a direct line with the center of the crank-shaft 1. Consequently, when said crank-shaft 1 rotates, the casing, tube 16, cup and plunger rotate but at no time do they revolve.

The operation is as follows: Should the driving-arm, crank and crank-shaft be in motion and it is desired to fill the cup 23, the operator grasps with one hand the cup 23 and with the other manipulates the hand-wheel 26, until the plunger 24 is removed from the cup. During this operation the casing continues to rotate, but, by reason of the tube 16 and cup 23 being independent from the casing 10, they will remain in tact and not turn as long as the cup 23 is in the grasp of the operator. When the plunger 24 has been removed from the cup 23, the grease or lubricant is placed in said cup and the plunger 24 again positioned in the forward end of said cup. When it is desired to cause the grease or lubricant to pass into the recess in the crank-pin 3, the operator grasps the cup 23 in one hand and with the other manipulates the hand-wheel 26 in the proper direction which causes the plunger 24 to enter the cup 23, thus pressing against the grease or lubricant. This will force said grease or lubricant through the passage in the tube 16, through the cross-passage 19 that leads to the passage in the upwardly extending portion 11 of the casing, through the tubes 9 and 7 and into the recess or passages 5 and 6 in the crank-pin 3. Thus the grease or lubricant is forced to the desired point. Thus it will be seen how I have constructed a grease cup attachment for crank-pins that is simple, easily operated, and complete in its workings.

What I claim is—

The improved grease-cup attachment for crank-pins, comprising a crank pin, a tube connected to said pin and extending parallel thereto, a cylindrical casing located parallel with said crank pin, having a circular bore enlarged at one end and provided at the opposite end with a stuffing-box, said enlarged bore being internally screw-threaded, a plug detachably located in the free end of said screw-threaded enlargement, a tubular-connection between said casing and said tube, a horizontal tube provided at one end with a cylindrical-head or enlargement which is mounted to revolve in the enlargement of said casing, said head having a peripheral recess and connected cross-passages, and a grease-cup mounted on the end of said horizontal-tube which is opposite said enlargement, exterior of said casing and adjacent said stuffing box, substantially as herein specified.

In testimony whereof I affix my signature in presence of two witnesses.

IRA FRANCIS ZIMMERMAN.

Witnesses:
CHARLES VAN ANTWERP,
CHAS. G. TAYLOR.